United States Patent [19]
Daoud et al.

[11] Patent Number: 6,024,598
[45] Date of Patent: Feb. 15, 2000

[54] BRACKET FOR IDC CONNECTORS WITH CABLE SLACK STORAGE

[75] Inventors: Bassel H. Daoud, Parsippany; Jason A. Kay, Morristown, both of N.J.; Ronald Marchisin, Toby Hanna, Pa.

[73] Assignee: Lucent Technologies Inc., Murray Hill, N.J.

[21] Appl. No.: 09/034,919

[22] Filed: Mar. 5, 1998

[51] Int. Cl.[7] .................................................. H01R 13/72
[52] U.S. Cl. ........................................ 439/501; 439/397
[58] Field of Search ................................ 439/501, 540.1, 439/210, 211–214, 401, 406–7, 397; 174/89–92, 93, 94 R

[56] References Cited

U.S. PATENT DOCUMENTS

| | | | |
|---|---|---|---|
| 4,289,366 | 9/1981 | Marks | 339/49 |
| 5,378,166 | 1/1995 | Gallagher, Sr. | 439/214 |
| 5,531,612 | 7/1996 | Goodall et al. | 439/541.5 |
| 5,551,896 | 9/1996 | Hess et al. | 439/701 |
| 5,616,047 | 4/1997 | Lutsch | 439/397 |
| 5,691,508 | 11/1997 | Radliff et al. | 174/92 |

*Primary Examiner*—Lincoln Donovan

[57] ABSTRACT

C-shaped rails define an interior volume of the bracket that can be used to store slack from a cable, whose wires are terminated by the insulation displacement connectors (IDCs) mounted on fingers extending from the rails. End plates, holding the rails in place, have apertures for receiving cables and bundles of wires. In one application, the bracket can be mounted within a secured enclosure. In another application, two or more brackets can be mounted with abutting end plates to enable wires from a single cable to be terminated at IDCs mounted within different brackets.

3 Claims, 3 Drawing Sheets

BRACKET FOR IDC CONNECTORS WITH CABLE SLACK STORAGE

BACKGROUND OF THE INVENTION

1. Field of the Invention

The present invention relates to electrical connectors, and, in particular, to brackets for mounting insulation displacement connectors (IDCs) used to terminate cable wires.

2. Description of the Related Art

Insulation displacement connectors are often used in telecommunication applications to terminate wires, such as twisted pairs, that are broken out of a multi-wire cable. The IDCs are simultaneously used to terminate wiring carrying signals to and from various telecommunication equipment, such as phones, faxes, and computers, to connect the various telecommunication equipment to the multi-wire cable. The multi-wire cable may be used, for example, to carry the telecommunication signals to and from the central office of a telecommunication service provider.

In some applications, a multi-wire cable may have more twisted pairs than are currently needed to support the telecommunication equipment at a particular location. Nevertheless, the extra, unused pairs may be needed in the future to support expansion of services as more telecommunication equipment is added to the location.

SUMMARY OF THE INVENTION

The present invention is directed to a bracket designed to receive multi-wire cabling and mount one or more IDC connectors used to terminate wires, such as twisted pairs, broken out from the cable. The bracket, along with the IDC connectors, may be, but need not be, mounted within an enclosure. In any case, the bracket is designed to store cable slack in an efficient manner that enables future expansion. This future expansion may include the termination of additional wires from the cable as a result of the addition of more IDC connectors within the bracket and/or the addition of one or more brackets with their own IDC connectors.

According to one embodiment, the present invention is a bracket for terminating wires of a multi-wire cable for connection to communication equipment. The bracket comprises (a) a pair of rails defining an interior volume adapted to store slack from the cable; (b) one or more pairs of fingers extending from the rails and configured to mount one or more insulation displacement connectors adapted to terminate wires broken out from the cable and wires from the communication equipment; and (c) a pair of end plates, each end plate connected to an end of each rail and at least one end plate having at least one aperture, wherein the aperture is adapted to receive the cable.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
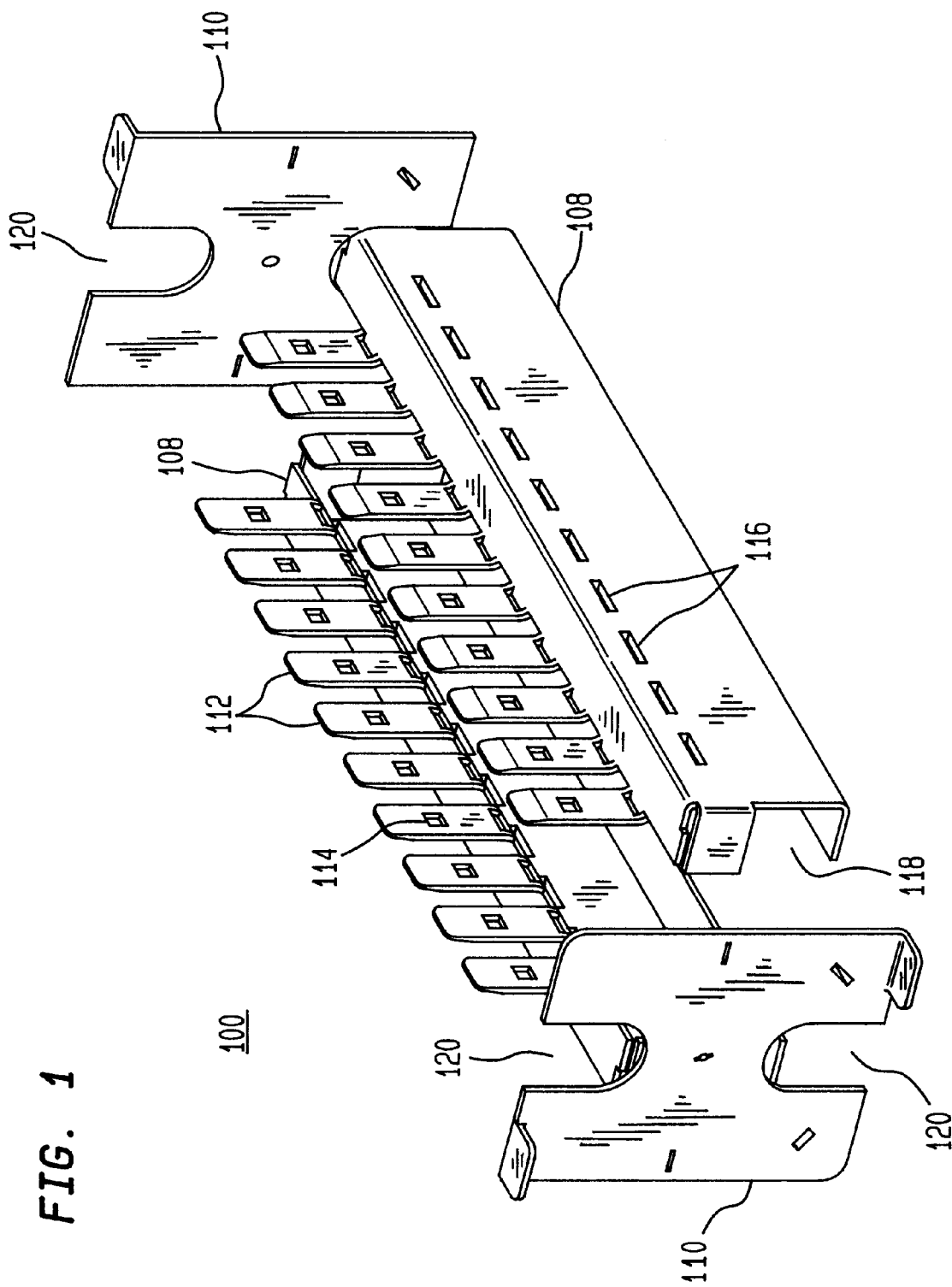
FIG. 1 shows an exploded perspective view of a bracket, according to one embodiment of the present invention.
Figure 2:
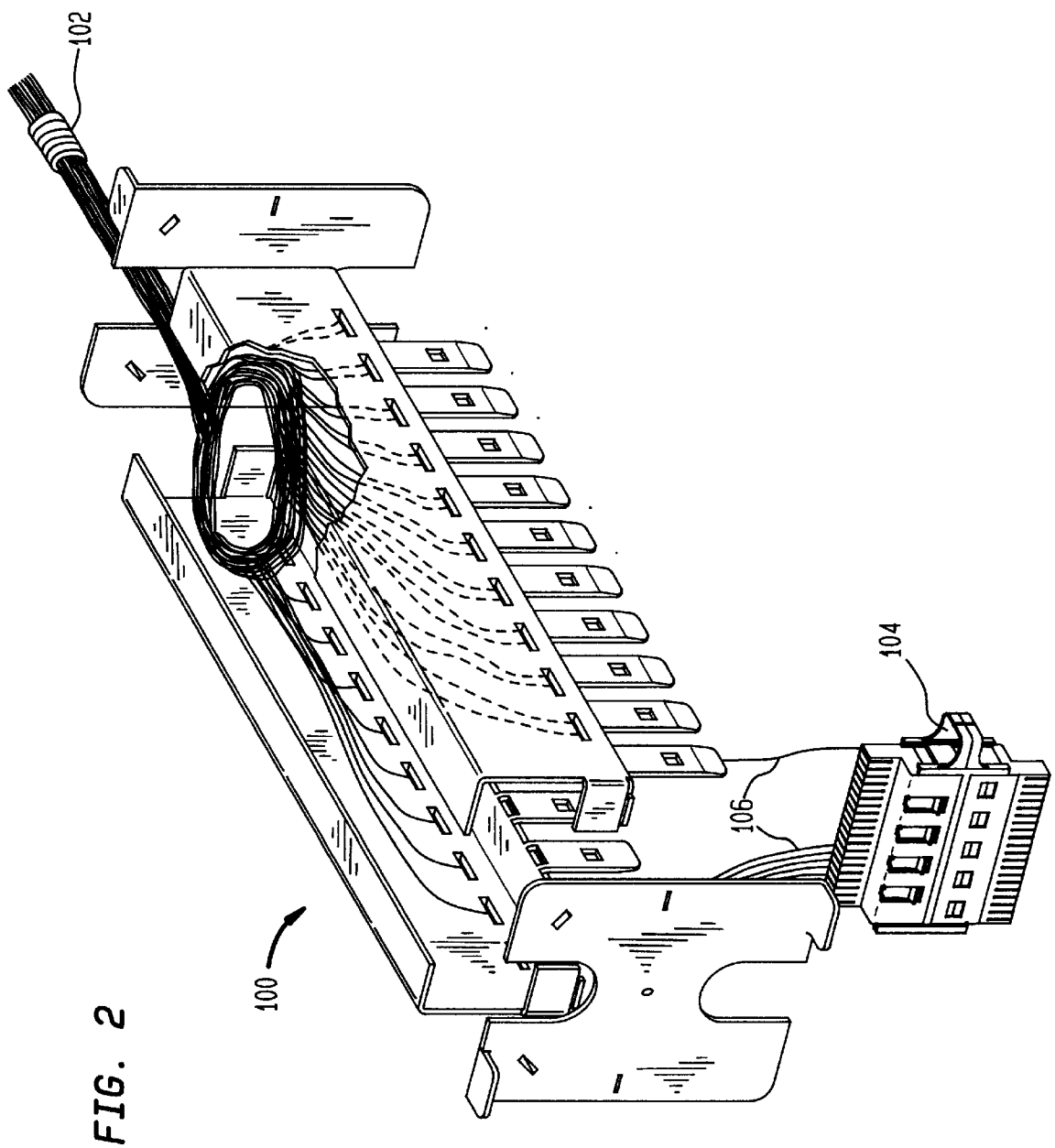
FIG. 2 shows an inverted exploded perspective view of the bracket of FIG. 1 receiving a multi-wire cable and mounting an insulation displacement connector terminating some of the wires broken out from the cable.
Figure 3A:
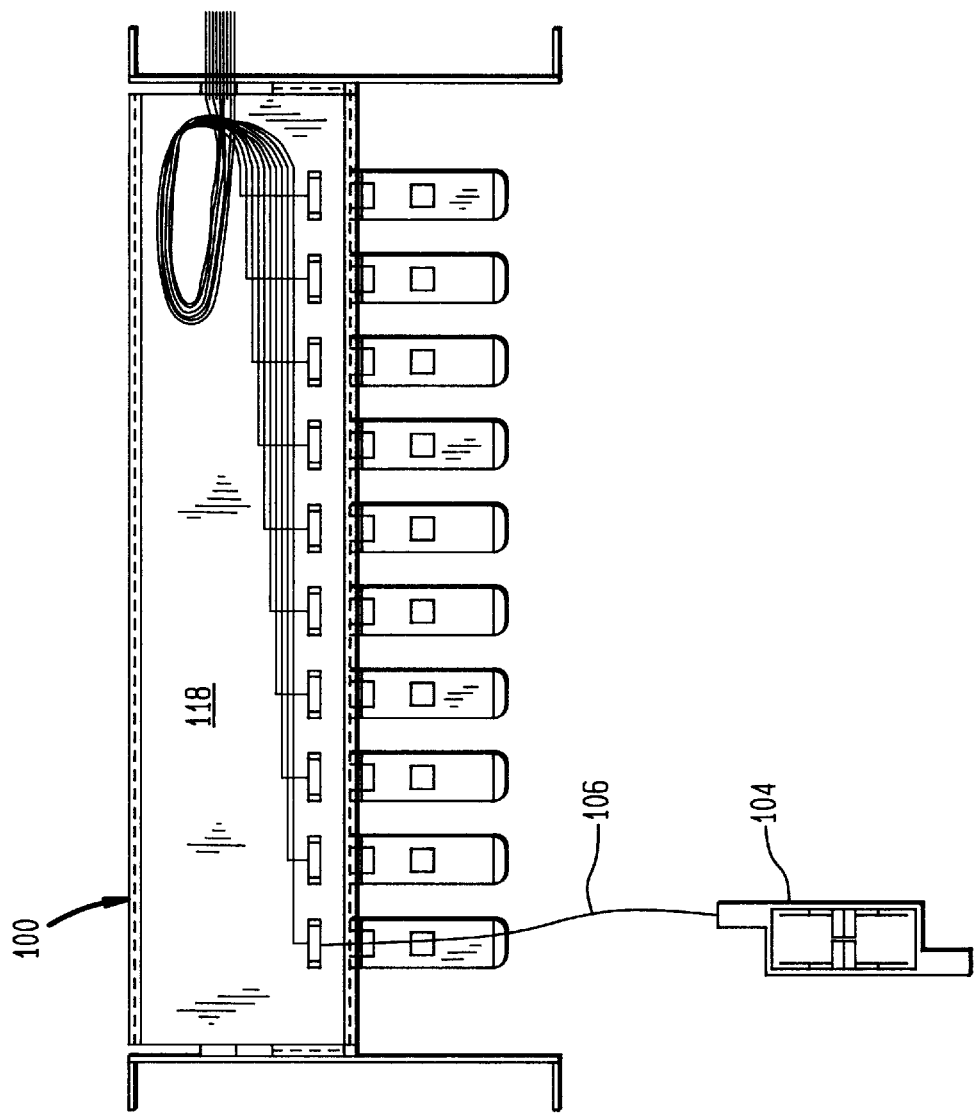
FIGS. 3A and 3B show an end view and a side view of the configuration of FIG. 2, with the IDC exploded from the assembled bracket.
Figure 3B:
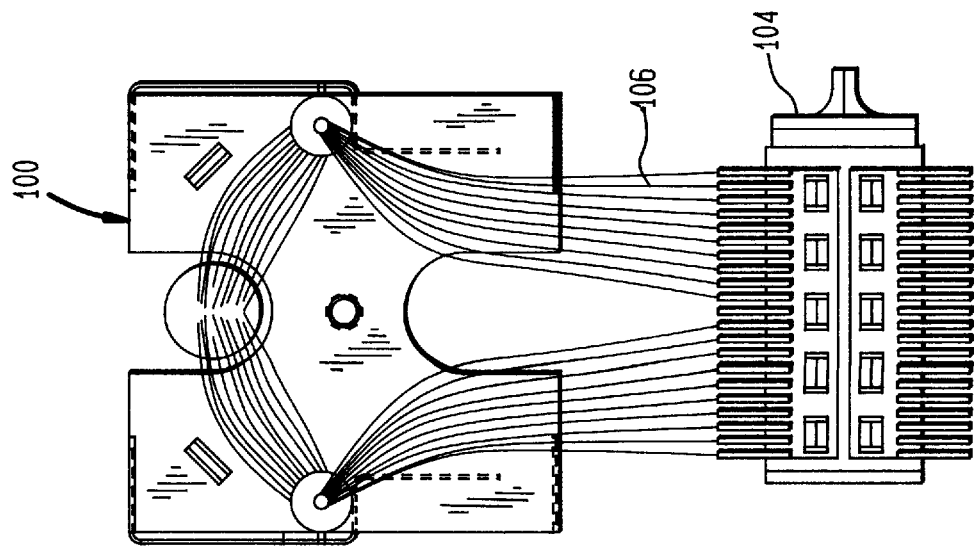

FIG. 1 shows an exploded perspective view of a bracket 100, according to one embodiment of the present invention. FIG. 2 shows an inverted exploded perspective view of bracket 100 receiving a multi-wire cable 102 and mounting an insulation displacement connector 104 terminating some of the wires 106 broken out from cable 102. FIGS. 3A and 3B show an end view and a side view of the configuration of FIG. 2, with the IDC 104 exploded from the assembled bracket 100.

Referring again to FIG. 1, bracket 100 comprises two inwardly facing C-shaped rails 108 held in place by two end plates 110. Each rail 108 has a number (e.g., 10 in FIG. 1) of fingers 112, arranged in opposing pairs between the two rails and each pair adapted to receive an IDC, such as IDC 104 of FIG. 2. Each finger 112 has a hole 114 adapted to engage a tab on an IDC to hold the IDC in place. The rails 108 also have cable tie-downs 116 through which cable wraps are threaded to arrange and organize bundles of wires terminated by the IDCs mounted within bracket 100. Each end plate 110 has upper and lower apertures 120 for receiving cables, such as cable 102 in FIG. 2, and/or bundles of wires from either a cable or the communication equipment being connected to the cable at the IDCs mounted within bracket 100.

The C-shape of the rails 108 define an interior volume 118 within the bracket 100. As shown in FIGS. 2 and 3A–B, this interior volume 118 can be used to store unused wires broken out of the cable 102 and other cable slack.

Bracket 100 can be mounted within an enclosure for a secured application in which access to the cable breakout and IDC-wire connections is restricted to only those individuals entitled to have access to the interior of the enclosure. Such an enclosure may have two or more pivotally connected sections defining a bottom, four walls, and a lid of the enclosure, where the sections may be secured in a closed position by a lock or other security device to restrict access to the bracket mounted within the enclosure.

In another application, bracket 100 can be mounted directly to a wall, without being mounted within an enclosure. Such an application enables expansion in which one or more additional identical brackets are mounted with abutting end plates (i.e., end-plate-to-end-plate). In such a configuration, the wires from a single multi-wire cable can be broken out to the IDCs mounted within two or more different brackets, by passing bundles of wires through the apertures in the abutting end plates.

The brackets of the present invention provide an efficient means for terminating wires from multi-wire cabling at IDCs. The design of the brackets ensures that the cable and its wiring as well as the IDCs can be configured together in an organized fashion within a relatively compact volume.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A bracket for terminating wires of a multi-wire cable for connection to communication equipment, comprising:
   (a) a pair of rails defining an interior volume adapted to store slack from the cable;
   (b) one or more pairs of fingers extending from the rails and configured to mount one or more insulation displacement connectors (IDCs) adapted to terminate wires broken out from the cable and wires from the communication equipment; and (c) a pair of end plates, each end plate connected to an end of each rail and each end plate having at least one aperture aligned along a common axis, wherein each aperture is adapted to receive terminating wires such that two or more brackets can be mounted with abutting end plates to enable wires from the cable to be terminated at IDCs mounted within different brackets, wherein wires from the cable are passed through the apertures of abutting end plates from one bracket to the next.

2. The bracket of claim 1, wherein the bracket is adapted to be mounted within a secured enclosure to restrict access to the terminated wires.

3. The bracket of claim 1, wherein each end plate has an upper aperture and a lower aperture, each adapted to receive wiring for termination at the IDCs.

* * * * *